(12) United States Patent
Ohashi

(10) Patent No.: US 11,942,769 B2
(45) Date of Patent: Mar. 26, 2024

(54) PROTECTOR FOR WIRE HARNESS

(71) Applicant: SUMITOMO WIRING SYSTEMS, LTD., Mie (JP)

(72) Inventor: Tsuguo Ohashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 281 days.

(21) Appl. No.: 17/621,371

(22) PCT Filed: Jun. 26, 2020

(86) PCT No.: PCT/JP2020/025304
§ 371 (c)(1),
(2) Date: Dec. 21, 2021

(87) PCT Pub. No.: WO2021/002294
PCT Pub. Date: Jan. 7, 2021

(65) Prior Publication Data
US 2022/0360060 A1    Nov. 10, 2022

(30) Foreign Application Priority Data

Jul. 2, 2019 (JP) ................................. 2019-123366

(51) Int. Cl.
*H02G 3/04* (2006.01)
*B60R 16/02* (2006.01)

(52) U.S. Cl.
CPC ....... *H02G 3/0487* (2013.01); *B60R 16/0215* (2013.01); *H02G 3/0406* (2013.01)

(58) Field of Classification Search
CPC ...... H02G 3/0487; H02G 3/0406; H02G 3/04; B60R 16/0215

USPC ......................................................... 174/68.3
See application file for complete search history.

(56) References Cited

U.S. PATENT DOCUMENTS

2018/0013276 A1    1/2018  Keda et al.

FOREIGN PATENT DOCUMENTS

| JP | 2002-010438 A | 1/2002 |
|----|---------------|--------|
| JP | 2006-025515 A | 1/2006 |
| JP | 2014-087182 A | 5/2014 |
| WO | 2018/193840 A1 | 10/2018 |

OTHER PUBLICATIONS

International Search Report dated Sep. 1, 2020 for WO 2021/002294 A1 (4 pages).

*Primary Examiner* — Tremesha S Willis
(74) *Attorney, Agent, or Firm* — Venjuris, P.C.

(57) ABSTRACT

The present disclosure provides a protector for a wire harness that can suppress attachment of water to a surrounding electrical component. In a longitudinal direction X along the horizontal direction of the protector main body portion 11 in a state in which a protector is mounted in a vehicle, there is a first region A1 where an electrical component E is located below a protector main body portion 11, and a second region A2 where there is no electrical component E below the protector main body portion 11. A groove 21 that is open vertically upward is provided in an outer surface of the protector main body portion 11. The groove 21 extends over the first region A1 and the second region A2, and is inclined vertically downward while extending toward the second region A2.

8 Claims, 3 Drawing Sheets and the groove is
inclined vertically downward while extending toward the
second region.

Effect of the Invention

According to the present disclosure, it is possible to
provide a protector for a wire harness with which attachment
of water to a surrounding electrical component can be
suppressed.

Figure 1:
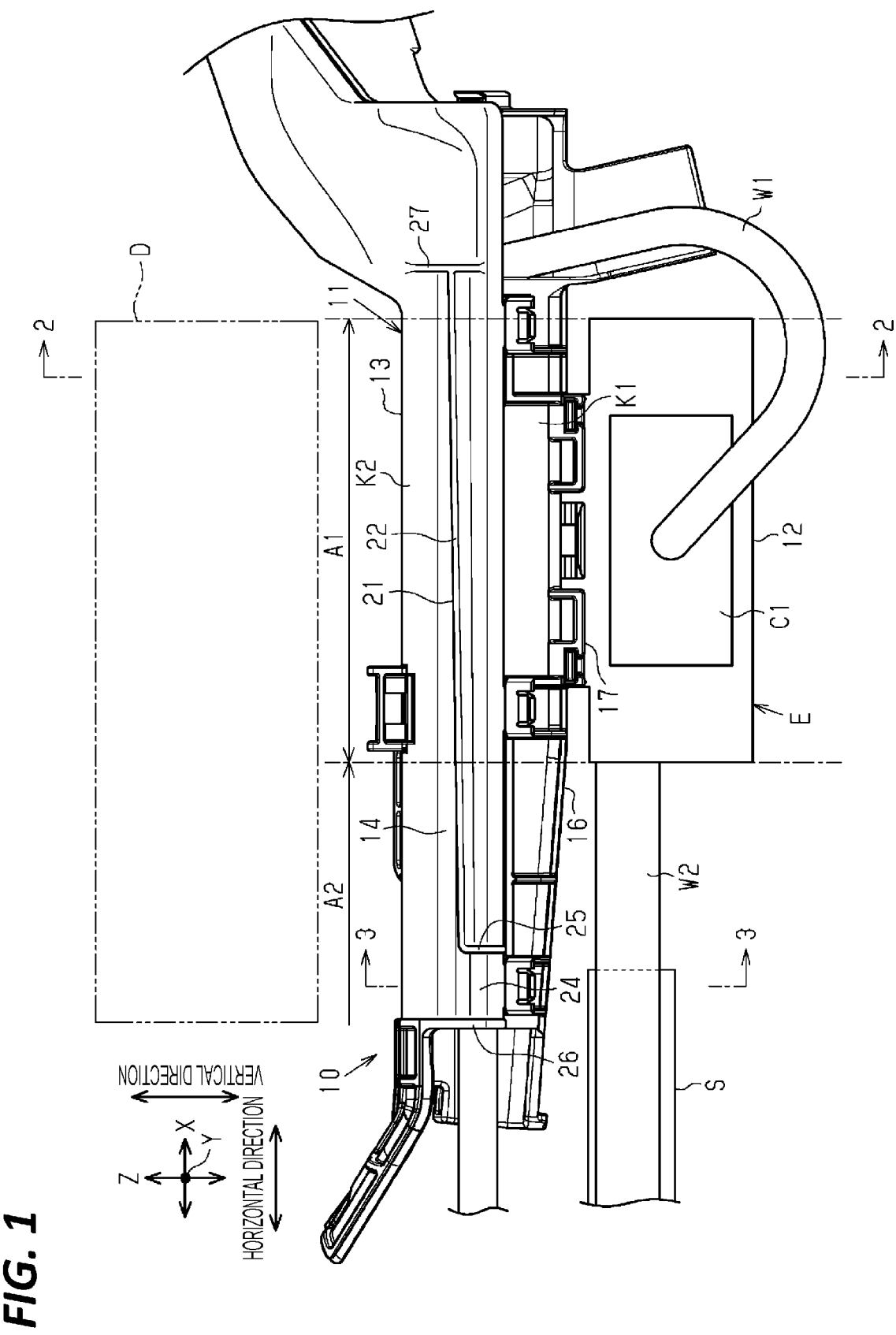
FIG. 1 is a schematic view for illustrating a protector
according to an embodiment.

DETAILED DESCRIPTION TO EXECUTE THE
INVENTION

Description of Embodiments of Disclosure

First, aspects of the present disclosure will be listed and
described.
A protector for a wire harness according to the present
disclosure is:
[1] a protector for a wire harness, the protector including
a tubular protector main body portion into which a wire
harness is to be inserted, and the protector main body portion
being arranged vertically above an electrical component in
a vehicle, and in a horizontal direction of the protector main
body portion in a state in which the protector is mounted in
the vehicle, there is a first region that is a region where the
electrical component is located vertically below the protector main body portion, and a second region that is a region
where there is no electrical component vertically below the
protector main body portion, a groove that is open vertically
upward is provided in an outer surface of the protector main
body portion, the groove extends over the first region and the
second region, and the groove is inclined vertically downward while extending toward the second region.
According to the above aspect, due to the inclination of
the groove, water attached to the protector main body
portion can be guided to the second region of the protector
main body portion, which is a region where there is no
electrical component vertically below the protector main
body portion. For this reason, it is possible to suppress the
case where water that has dropped from the protector main
body portion becomes attached to the electrical component
located below the protector main body portion.
[2] It is preferable that the first region and the second
region are each one of a plurality of regions obtained by
dividing the protector main body portion in a longitudinal
direction of the protector main body portion, and the groove
is inclined vertically downward while extending toward the
second region in the longitudinal direction.
According to the above aspect, a region (i.e., second
region) that allows droplets to drop from the protector main
body portion is more likely to be formed in the longitudinal
direction of the protector main body portion than in a
transverse direction. For this reason, it is possible to guide

PROTECTOR FOR WIRE HARNESS

CROSS REFERENCE TO RELATED APPLICATIONS

This application is a national phase of PCT application
No. PCT/JP2020/025304, filed or 26 Jun. 2020, which
claims priority from Japanese patent application No. 2019-
123366, filed or 2 Jul. 2019, all of which are incorporated
herein by reference.

TECHNICAL FIELD

The present disclosure relates to a protector for a wire
harness.

BACKGROUND

For example, a protector disclosed in Patent Document 1
includes a tubular main body portion into which a wire
harness can be inserted, and an electrical component such as
a connector portion is arranged in the surroundings of the
main body portion.

PRIOR ART DOCUMENT

Patent Document

Patent Document 1: JP 2002-010438 A

SUMMARY OF THE INVENTION

Problems to be Solved

In a vehicle, dew condensation is likely to occur in a
component such as an air conditioning device, and water
formed due to such dew condensation may become attached
to an electrical component such as the connector portion. In
view of this, the protector is arranged above the electrical
component, and thus the protector covers the space above
the electrical component, and the case where droplets drop
directly onto the electrical component can be suppressed.
However, in this case, the droplets attached to the protector
may run along a side surface of the protector and reach the
electrical component, and there is room for improvement.
In view of this, an object of the present disclosure is to
provide a protector for a wire harness with which attachment
of water to a surrounding electrical component can be
suppressed.

Means to Solve the Problem

A protector for a wire harness according to the present
disclosure is a protector for a wire harness, the protector
including a tubular protector main body portion into which
a wire harness is to be inserted, and the protector main body
portion being arranged vertically above an electrical component in a vehicle, and in a horizontal direction of the
protector main body portion in a state in which the protector
is mounted in the vehicle, there is a first region that is a
region where the electrical component is located vertically
below the protector main body portion, and a second region
that is a region where there is no electrical component
vertically below the protector main body portion, a groove
that is open vertically upward is provided in an outer surface
of the protector main body portion, the groove extends over the droplets to the region that allows the dropping of droplets without increasing the size of the protector main body portion.

[3] It is preferable that the groove includes a drain portion configured to drain water in the groove to an outside of the groove, in the second region.

According to the above aspect, water flowing in the groove can be proactively drained from the second region. For this reason, water can be prevented from overflowing from an unintended position of the groove.

[4] It is preferable that a holding portion configured to hold the electrical component is provided at a vertically lower surface of the protector main body portion.

According to the above aspect, the protector main body and the electrical component, which is provided below the protector main body portion, can be configured as an integrated member.

[5] It is preferable that the electrical component includes a connector provided at an end portion of the wire harness.

According to the above aspect, the attachment of water to the connector can be suppressed.

[6] It is preferable that the protector main body portion includes an upper wall and a side wall that extends vertically downward from the upper wall, and the groove is provided in an outer surface of the side wall.

According to the above aspect, water that drops onto the upper wall of the protector main body portion, flows toward the side wall, and enters the groove can be guided to the second region.

[7] It is preferable that the upper wall is inclined vertically downward while extending toward the side wall.

According to the above aspect, water that drops onto the upper wall of the protector main body portion can be suitably caused to flow toward the side wall.

[8] It is preferable that the protector main body portion is arranged vertically below a component of an air conditioning device mounted in the vehicle.

According to the above aspect, dew condensation is likely to occur in the component of the air conditioning device, and water formed due to the dew condensation drops onto the protector main body portion. For this reason, water that drops from the protector main body portion can be prevented from attaching to the electrical component, and the effect of the above configuration can be more markedly achieved.

DESCRIPTION OF EMBODIMENTS OF DISCLOSURE

Specific examples of a protector for a wire harness according to the present disclosure will be described below with reference to the drawings. The present invention is not limited to the embodiments disclosed herein, but rather is defined in the claims, and intended to include all modifications within the meaning and the scope equivalent thereof. Note that "parallel" does not mean "parallel" in the exact meaning, but rather means a broad range that should be considered as being "parallel" as long as the effects of the present invention can be achieved. Also, with respect to x, y, and z-axes that are orthogonal to each other in the drawings, the X axis direction corresponds to a longitudinal direction of a protector 10, the Y axis direction corresponds to a depth direction of the protector 10, and the Z axis direction corresponds to a height direction of the protector 10.

Figure 2:
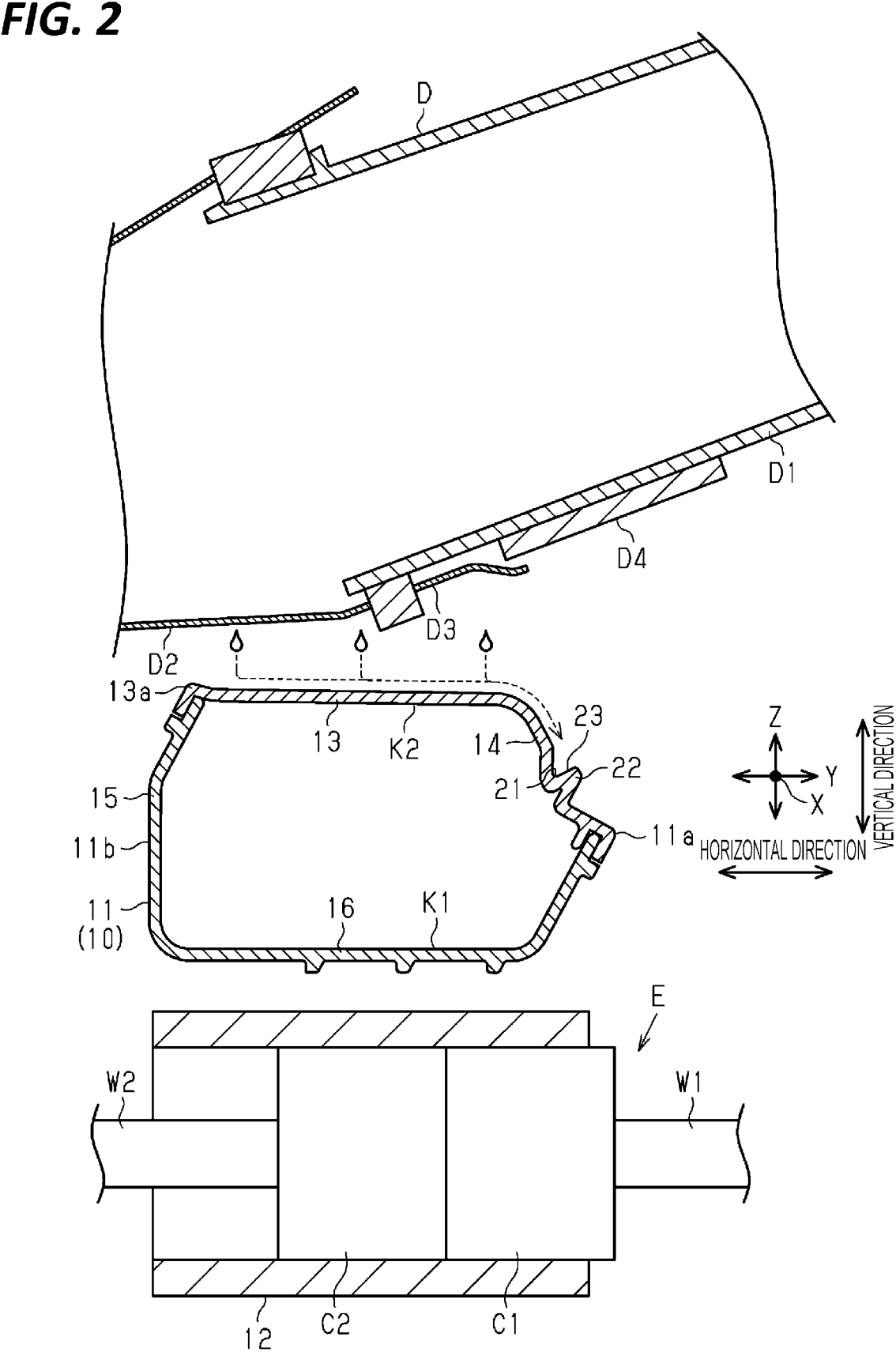
FIG. 2 is a cross sectional view taken along line 2-2 in
FIG. 1.

As shown in FIGS. 1 and 2, the protector 10 of the present embodiment is to be mounted in a vehicle and protect a wire harness W1 for the vehicle. More specifically, the protector 10 is to be arranged vertically below components D of an air conditioning device mounted in the vehicle. Note that the components D of the air conditioning device of the present embodiment are a cylindrical register D1 that forms a blast port of the air conditioning device, and a duct D2 (see FIG. 2) attached to the register D1 so as to be continuous with the register D1. The protector 10 is located vertically below a coupling portion D3 of the register D1 and the duct D2.

The protector 10 is mounted in the vehicle such that the height direction Z is parallel with the vertical direction, and the longitudinal direction X of the protector 10 is parallel with the horizontal direction. Also, in a state where the protector 10 is mounted in the vehicle, the depth direction Y of the protector 10 is parallel with the horizontal direction. Note that in the present embodiment, the protector 10 is mounted in the vehicle such that the depth direction Y of the protector 10 is parallel with the vehicle front-rear direction, and the longitudinal direction X of the protector 10 is parallel with the vehicle width direction. Also, in the description below, "vertically upward", "vertically above", "vertically downward", and "vertically below" may be simply referred to as "upward", "above", "downward", and "below", respectively.

Configuration of Protector 10

As shown in FIGS. 1 and 2, the protector 10 includes a tubular protector main body portion 11 into which a wire harness W1 can be inserted and a connector holder 12 provided vertically below the protector main body portion 11.

The protector main body portion 11 includes an upper wall 13 that is substantially parallel with the horizontal direction, a pair of side walls, namely, a first side wall 14 and a second side wall 15, extending downward from the two edges in the depth direction Y of the upper wall 13, and a bottom wall 16 that joins the lower end portions of the first and second side walls 14 and 15. In this manner, the protector main body portion 11 has a tubular shape that extends in the longitudinal direction X. In other words, a cross section that is orthogonal to the longitudinal direction X of the protector main body portion 11 has an annular shape. The dimension in the longitudinal direction X of the protector main body 11 is longer than the dimension in the depth direction Y of the protector main body portion 11. The wire harness W1 is inserted into the protector main body portion 11 in the longitudinal direction X.

Note that, the protector main body portion 11 is formed in a tubular shape by a lower case K1 and an upper case K2 being combined with each other. The lower case K1 forms the bottom wall 16, part of the first side wall 14, and the second side wall 15 of the protector main body portion 11. The upper case K2 forms the upper wall 13 and part of the first side wall 14 of the protector main body portion 11. Note that the lower case K1 and the upper case K2 are injection molded components made of a synthetic resin.

Configuration of Connector Holder 12

The connector holder 12 is provided separately from the protector main body portion 11. The connector holder 12 is fixed to a fixing portion 17 formed on the lower surface (i.e., lower surface of the lower case K1) of the bottom wall 16. The connector holder 12 overlaps the protector main body portion 11 in the vertical direction (height direction Z).

The connector holder 12 holds a first connector C1 and a second connector C2. The first connector C1 is mounted to the connector holder 12 from one side in the depth direction Y, and the second connector C2 is mounted to the connector holder 12 from the other side in the depth direction Y. The first connector C1 and the second connector C2 are connected to each other inside the connector holder 12. Note that in the present embodiment, the wire harness W1 extending from the first connector C1 is inserted into the protector main body portion 11.

As described above, in the present embodiment, an electrical component E including the connector holder 12, the first connector C1 and the second connector C2 is arranged vertically below the protector main body portion 11. Also, more specifically, the electrical component E is located vertically below the end portion (first end portion 11a) on the first side wall 14 side in the depth direction Y of the protector main body portion 11.

Figure 3:
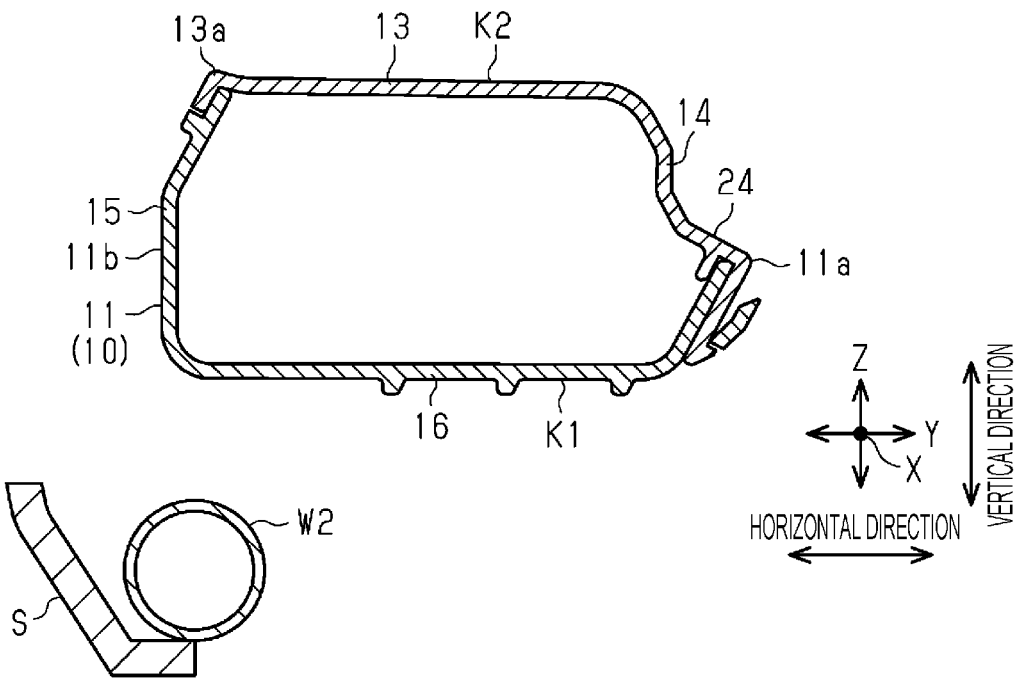
FIG. 3 is a cross sectional view taken along line 3-3 in
FIG. 1.

Note that, as shown in FIGS. 1 and 3, the wire harness W2 extending from the second connector C2 is supported by a harness supporting portion S. Note that the harness supporting portion S is provided separately from the protector 10. Also, the harness supporting portion S and the wire harness W2 supported by the harness supporting portion S are arranged vertically below the end portion (second end portion 11b) on the second side wall 15 side in the depth direction Y of the protector main body portion 11.

First Region A1 and Second Region A2 Here, as shown in FIG. 1, when the protector 10 is seen from the depth direction Y (direction orthogonal to the paper surface of FIG. 1) that is parallel with the horizontal direction, a region where the electrical component E is located vertically below the protector main body portion 11 is a first region A1, and a region where there is no electrical component E vertically below the protector main body portion 11 is a second region A2. Note that, the first region A1 and the second region A2 each are one of a plurality of regions obtained by dividing the protector main body portion 11 in the longitudinal direction X. In the first region A1, the vertically upward projection of the electrical component E overlaps the protector main body portion 11 (see FIGS. 1 and 2).

Configuration of Groove 21

A groove 21 that extends substantially in the longitudinal direction X is formed in an outer surface of the first side wall 14.

As shown in FIG. 2, the groove 21 is formed in a recessed shape in which the cross section that is orthogonal to the longitudinal direction X is open vertically upward. Specifically, the protector main body portion 11 includes a protrusion 22 that protrudes from the outer surface of the first side wall 14. The protrusion 22 extends substantially in the longitudinal direction X (see FIG. 1). An upper surface of the protrusion 22 is an inclined surface 23 that is inclined upward while extending away from the outer surface of the first side wall 14. The inclined surface 23 faces the outer surface of the first side wall 14 in the depth direction Y. The recessed shape of the groove 21 that is recessed substantially in a V shape is formed by the first side wall 14 and the inclined surface 23.

As shown in FIG. 1, the groove 21 formed by the protrusion 22 extends over the first region A1 and the second region A2. The groove 21 is inclined vertically downward while extending toward the second region A2 as seen in the depth direction Y. Further, the pitch of the inclination of the groove 21 is constant in the longitudinal direction. Note that it is preferable that the groove 21 is formed to have at least a length including the entirety of the first region A1.

The groove 21 includes a drain portion 24 in the second region A2. The drain portion 24 of the present embodiment is formed at the end portion (left end portion in FIG. 1) downstream of the groove 21.

Figure 4:
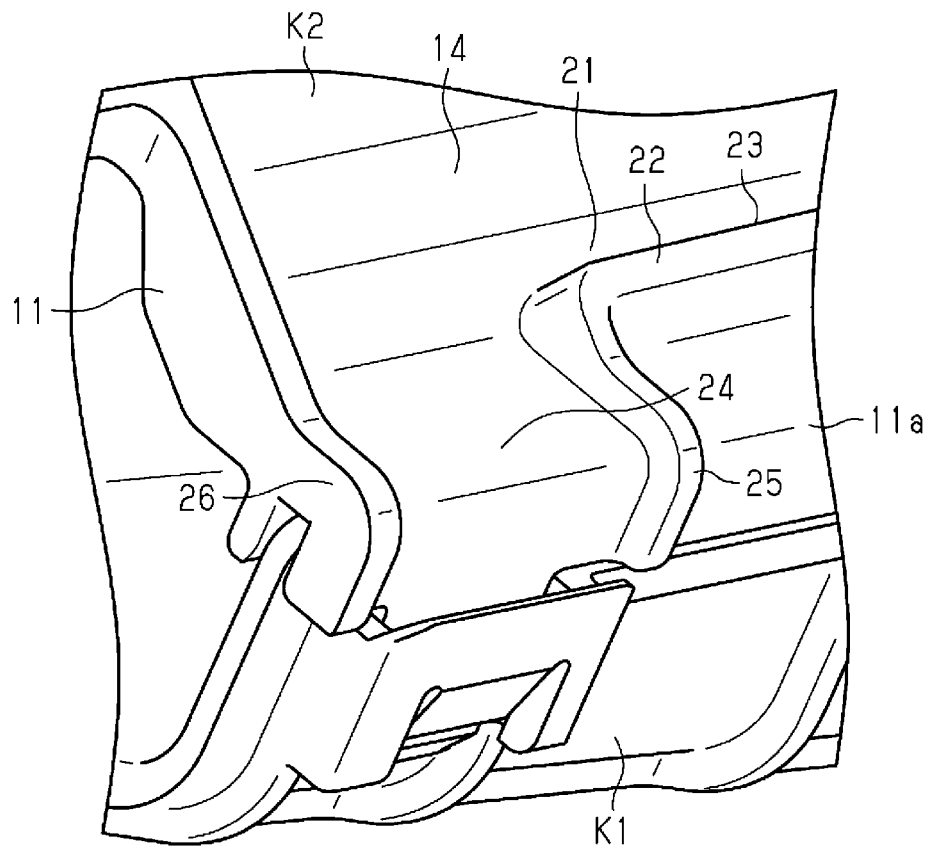
FIG. 4 is a perspective view showing a portion of a groove
of the protector according to the embodiment in an enlarged
manner.

As shown in FIGS. 1 and 4, the drain portion 24 includes a pair of facing walls (a first facing wall 25 and a second facing wall 26) that protrude from the first side wall 14. The first and second facing walls 25 and 26 are formed along an up-down direction (z-axis direction) as seen in the depth direction Y. Also, the first and second facing walls 25 and 26 face each other in the longitudinal direction X. One of the facing walls (first facing wall 25) is continuous with the protrusion 22 that forms the groove 21. Also, as shown in FIG. 1, a wall portion 27 that extends upward from the protrusion 22 is formed at the end portion (right end portion in FIG. 1) upstream of the groove 21. The wall portion 27 protrudes from the outer surface of the first side wall 14.

Note that in the above embodiment, it is preferable that the surface of the upper wall 13 of the protector main body portion 11 has an inclination pitch that is inclined slightly downward toward the first side wall 14 (toward the side wall including the groove 21) of the depth direction Y. Also, a dam portion 13a that is raised upward is formed at the end portion on the second side wall 15 side of the upper wall 13.

The operation of the present embodiment will be described below.

As shown in FIG. 2, when dew condensation occurs in the components D of the air conditioning device arranged above the protector main body portion 11, the droplets formed due to the dew condensation drop onto the protector main body portion 11. Note that, as shown in FIG. 2, a dew condensation prevention sheet D4 such as a non-woven fabric is adhered to the lower surface of the register D1 in some cases, but dew condensation occurs at a location where the dew condensation prevention sheet D4 cannot be placed, such as the coupling portion D3 of the register D1 and the duct D2.

The droplets attached to the upper wall 13 of the protector main body portion 11 flow toward the first side wall 14 due to the inclination pitch of the upper wall 13, and dammed by the groove 21 (inclined surface 23 of the protrusion 22). Then, the droplets that have accumulated in the groove 21 of the first side wall 14 flow toward a region below which there is no electrical component E, and drop from the drain portion 24 within the second region A2 to the region below the protector main body portion 11. Note that the droplets attached to the upper wall 13 are unlikely to flow toward the second side wall 15 due to the inclination pitch of the upper wall 13 and the dam portion 13a.

Effects of the present embodiment will be described below.

(1) The groove 21 provided on the outer surface of the protector main body portion 11 extends over the first region A1 and the second region A2 and is inclined vertically downward while extending toward the second region A2. In this manner, due to the inclination of the groove 21, water attached to the protector main body portion 11 can be guided toward the second region A2, which is a region where there is no electrical component E vertically below the protector main body portion 11. For this reason, it is possible to suppress the case where water that has dropped from the protector main body portion 11 becomes attached to the electrical component E located below the protector main body portion 11. Also, the droplets attached to the protector main body portion 11 can be guided in the longitudinal direction X through the groove 21, and thus as in the present embodiment, even if the wire harness W1 is drawn out from the first connecter C1 toward the first side wall 14 in the depth direction Y, attachment of droplets to the wire harness W1 can be suppressed.

(2) The first region A1 and the second region A2 are each one of a plurality of regions obtained by dividing the protector main body portion 11 in the longitudinal direction X of the protector main body portion 11. The groove 21 is inclined vertically downward while extending toward the second region A2 in the longitudinal direction X.

A comparative configuration that is different from the present embodiment is also possible in which, due to extending the length of the first end portion 11a of the protector main body portion 11 in the depth direction Y, droplets attached to the protector main body portion 11 are guided in the depth direction Y such that droplets dropping from the first end portion 11a are unlikely to come in contact with the electrical component E. However, with this comparative configuration, the size of the protector main body portion 11 in the depth direction Y is increased.

In view of this, in the present embodiment, since the groove 21 is inclined vertically downward while extending in the longitudinal direction X, the droplets attached to the protector main body portion 11 can be guided in the longitudinal direction X through the groove 21. The dimension in the longitudinal direction X of the protector main body portion 11, which extends in a direction in which the wire harness W1 is inserted, is longer in order to ensure a predetermined length of the wire harness W1. In this manner, in the longitudinal direction X of the protector main body portion 11, a region where droplets are allowed to drop from the protector main body portion 11 (region where there is no electrical component E below the first end portion IIa of the protector main body portion 11, and in the present embodiment, the second region A2) is easily formed. For this reason, it is possible to guide droplets to the region that allows the dropping of droplets without increasing the size of the protector main body portion 11.

(3) The groove 21 includes the drain portion 24 for draining water in the groove 21 to the outside of the groove 21, in the second region A2. In this manner, water flowing in the groove 21 can be proactively drained from the second region A2. For this reason, water can be prevented from overflowing from an intended position in the groove 21.

(4) The connector holder 12 for holding the electrical component E is provided on the vertically lower surface of the protector main body portion 11. In this manner, the protector main body portion 11 and the electrical component E, which is provided below the protector main body portion 11, can be configured as an integrated member.

(5) The electrical component E includes the first connector C1 provided at the end portion of the wire harness W1 and the second connector C2 provided at the end portion of the wire harness W2. In this manner, attachment of water to the first connector C1 and the second connector C2 can be suppressed.

(6) The protector main body portion 11 includes the upper wall 13 and the first side wall 14 that extends vertically downward from the upper wall 13, and the groove 21 is provided in the outer surface of the first side wall 14. With this configuration, water that drops onto the upper wall 13 of the protector main body portion 11, flows toward the first side wall 14, and enters the groove 21 can be guided to the second region A2.

(7) The upper wall 13 is inclined vertically downward while extending toward the first side wall 14. In this manner, water that drops onto the upper wall 13 of the protector main body portion 11 can be suitably caused to flow toward the first side wall 14.

(8) The protector main body portion 11 is disposed vertically below the components D of the air conditioning device mounted in the vehicle. Dew condensation is likely to occur in the components D of the air conditioning device, and water formed due to the dew condensation drops onto the protector main body portion 11. For this reason, the effect of the above configuration, that is to say that water that drops from the protector main body portion 11 can be prevented from attaching to the electrical component E, can be more markedly achieved.

(9) Since the wall portion 27 that extends upward from the protrusion 22 is provided at the end portion upstream of the groove 21, water in the groove 21 can be prevented from draining from the end portion upstream of the groove 21.

The present embodiment can be implemented by making modifications as follows. The present embodiment and the modifications below may be implemented in combination with each other as long as no technical contradictions arise.

The configuration such as the shape of the groove 21 is not limited to the above embodiment, and can be modified as appropriate according to the configuration of the protector main body portion 11, the positional relationship between the protector main body portion 11 and the electrical component E, and the like.

For example, a configuration is also possible in which the inclined surface 23 of the groove 21 in the above embodiment is omitted, the bottom surface of the groove 21 is flat in the depth direction Y, a facing wall portion that extends in the height direction Z so as to face the outer surface of the first side wall 14 is provided, and a groove 21 is formed between the facing wall portion and the outer surface of the first side wall 14. Further, the groove 21 may also be provided in the upper wall 13 instead of the first side wall 14. Further, although it is described in the above embodiment that the groove 21 is formed in the upper case K2, the groove 21 may also be formed in the lower case K1.

In the above embodiment, the connector holder 12 is separate from the protector main body portion 11. However, there is no particular limitation to this, and the connector holder 12 may also be molded in one piece with the protector main body portion 11.

The configuration of the wire harness to be inserted into the protector main body portion 11 is not limited to the above embodiment, and may be modified as appropriate according to the configuration of the vehicle. For example, although it is described in the above embodiment that the wire harness W1, which extends from the first connector C1 held by the connector holder 12 of the protector 10, is inserted into the protector main body portion 11, a wire harness other than this may also be inserted into the protector main body portion 11. Also, a configuration is possible in which the wire harness W1 of the first connector C1 is not inserted into the protector main body portion 11.

Although the groove 21 in the above embodiment is provided with the drain portion 24 that is open vertically downward, there is no particular limitation to this. A configuration is also possible in which the drain portion 24 is omitted, and water that flows toward the second region A2 along the groove 21 naturally overflows from the groove 21.

The configuration of the electrical component E arranged vertically below of the protector main body portion 11 is not limited to the above embodiment, and an electrical component other than this may also be used.

In the above embodiment, the present invention is applied to the protector 10 arranged vertically below the component D of the air conditioning device. However, there is no particular limitation to this, and the present invention can be applied to a protector for a vehicle installed at another location.

The dimension of the protrusion 22 that protrudes from the outer surface of the first side wall 14 and extends substantially in the longitudinal direction X may be greater than the dimension of the protrusion of the first facing wall 25 and the second facing wall 26 from the first side wall 14. In this manner, water that flows in the groove 21 is prevented from overflowing from the groove 21 by the protrusion 22, and the volume of the first facing wall 25 and the second facing wall 26 that occupy the drain portion 24 can also be reduced, thus making it possible to contribute to a reduction in the size of the protector.

The upper wall 13 of the embodiment may be referred to as a drop receiving surface that is arranged such that liquid such as dew condensation water formed in the vehicle drops thereon.

The first side wall 14 in the embodiment may be referred to as an inclined surface that is an outward surface of the protector main body portion 11 and is arranged at a location that is lower in the vertical direction than the liquid receiving surface.

The first side wall 14, the groove 21, the protrusion 22, the inclined surface 23, the drain portion 24, the first facing wall 25, and the second facing wall 26 in the embodiment may be referred to as a liquid flow guide configured to guide the liquid that drops onto the liquid receiving surface of the protector main body portion 11 to a predetermined drain position via a predetermined liquid flow path.

The groove 21, the protrusion 22, and the inclined surface 23 in the embodiment may be referred to as a lateral gutter that is formed at the first side wall 14, is inclined downward from the first region to the second region, and guides liquid laterally toward the second region A2 so as to not drop onto the electrical device E.

The drain portion 24, the first facing wall 25, and the second facing wall 26 may be referred to as a vertical gutter that is formed at the first side wall 14 and is continuous with the lateral gutter in the second region A2, and guides liquid downward toward a predetermined drain position.

The present disclosure includes implementation examples such as the following. Reference numerals are given to some constituent elements of the exemplary embodiment in order to facilitate understanding, and are not intended to be limiting. Some of the items described in the following implementation examples may be omitted, and some of the items described in the implementation examples may be selected or extracted for combination with each other.

[Supplementary note 1] Some implementation examples of the present disclosure are directed to a protector (10) to be used with a wire harness (W1) that is to be routed in a vehicle and connected to an electrical device (E), wherein the protector (10) may include: a tubular protector main body portion (11) configured to house a first length portion of the wire harness (W1) and restrict the first length portion of the wire harness so as to extend along a predetermined routing path, the tubular protector main body portion (11) may have:
a first region (A1) that is positioned directly above the electrical device (E) and is overlapped with the electrical device (E) in the vertical direction; and
a second region (A2) that is different from the first region (A1), and is positioned so as to not vertically overlap the electrical device (E), the tubular protector main body portion (11) may include:
a droplet receiving surface (13) that is arranged such that a droplet or liquid that may be dew condensation water formed inside the vehicle drops onto the droplet receiving surface (13); and
a liquid flow guide (14, 21, 22, 23, 24, 25, 26) configured to collect the droplet or liquid that drops onto the liquid receiving surface (13) and guide the droplet or liquid toward a predetermined drain position via a predetermined liquid flow path (22), and
the predetermined drain position may be determined within the second region (A2).

[Supplementary note 2] In some implementation examples of the present disclosure, the liquid flow guide (14, 21, 22, 23, 24, 25, 26) may include:
an inclined surface (14) that is an outward surface (13,14, 15, 16) of the tubular protector main body portion (11) and is arranged at a position lower in the vertical direction than the droplet receiving surface (13),
a lateral gutter (21, 22, 23) that is formed at the inclined surface (14), is inclined downward from the first region (A1) toward the second region (A2), and guides the droplet or liquid laterally toward the second region (A2) so as to not drop onto the electrical device (E); and
a vertical gutter (24, 25, 26) that is formed at the inclined surface (14) and is continuous with the lateral gutter (21, 22, 23) in the second region(A2), and guides the droplet or liquid downward toward the predetermined drain position.

[Supplementary Note 3]
In some implementation examples of the present disclosure, the inclined surface (14) of the tubular protector main body portion (11), the lateral gutter (21, 22, 23), and the vertical gutter (24, 25, 26) may be an integrated member made of a synthetic resin.

[Supplementary Note 4]
In some implementation examples of the present disclosure, the lateral gutter (21, 22, 23) and the vertical gutter (24, 25, 26) may be grooves that each include a flat inner surface.

[Supplementary Note 5]
In some of implementation examples of the present disclosure, the lateral gutter (21, 22, 23) and the vertical gutter (24, 25, 26) may be a groove that extends continuously and seamlessly.

[Supplementary Note 6]
In some implementation examples of the present disclosure, the first region (A1) and the second region (A2) may be adjacent to each other in the horizontal direction.

[Supplementary Note 7]
In some implementation examples of the present disclosure, the tubular protector main body portion (11) may include a bottom surface (16) that faces the electrical device (E) via only an air layer.

[Supplementary Note 8]
Some implementation examples of the present disclosure may be configured as an attachment structure for attachment of the protector (10) to a vehicle that includes a constituent component (D) of an air conditioning device and an electrical device (E).

LIST OF REFERENCE NUMERALS

10 Protector
11 Protector main body portion
11a First end portion
12 Connector holder (holding portion)
13 Upper wall
13a Dam portion 14 First side wall
15 Second side wall
16 Bottom wall
17 Fixing portion
21 Groove
22 Protrusion
23 Inclined surface
24 Drain portion
25 First facing wall
26 Second facing wall
27 Wall portion
A1 First region
A2 Second region
C1 First connector
C2 Second connector
D Constituent component of air conditioning device
D1 Register
D2 Duct
D3 Coupling portion
D4 Dew condensation prevention sheet
E Electrical component
K1 Lower case
K2 Upper case
S Harness supporting portion
W1 Wire harness
W2 Wire harness
X Longitudinal direction
Y Depth direction
Z Height direction

What is claimed is:

1. A protector for a wire harness, the protector including a tubular protector main body portion into which a wire harness is to be inserted, and the protector main body portion being arranged vertically above an electrical component in a vehicle,
wherein, in a horizontal direction of the protector main body portion in a state in which the protector is mounted in the vehicle, there is a first region that is a region where the electrical component is located vertically below the protector main body portion, and a second region that is a region where there is no electrical component vertically below the protector main body portion,
a groove that is open vertically upward is provided in an outer surface of the protector main body portion,
the groove extends over the first region and the second region, and
the groove is inclined vertically downward while extending toward the second region.

2. The protector for a wire harness according to claim 1, wherein the first region and the second region are each one of a plurality of regions obtained by dividing the protector main body portion in a longitudinal direction of the protector main body portion, and
the groove is inclined vertically downward while extending toward the second region in the longitudinal direction.

3. The protector for a wire harness according to claim 1, wherein the groove includes a drain portion configured to drain water in the groove to an outside of the groove, in the second region.

4. The protector for a wire harness according to claim 1, wherein a holding portion configured to hold the electrical component is provided at a vertically lower surface of the protector main body portion.

5. The protector for a wire harness according to claim 1, wherein the electrical component includes a connector provided at an end portion of the wire harness.

6. The protector for a wire harness according to claim 1, wherein the protector main body portion includes an upper wall and a side wall that extends vertically downward from the upper wall, and
the groove is provided in an outer surface of the side wall.

7. The protector for a wire harness according to claim 6, wherein the upper wall is inclined vertically downward while extending toward the side wall.

8. The protector for a wire harness according to claim 1, wherein the protector main body portion is arranged vertically below a component of an air conditioning device mounted in the vehicle.

\* \* \* \* \*